United States Patent [19]

Koiki

[11] Patent Number: 4,498,160
[45] Date of Patent: Feb. 5, 1985

[54] SIMPLIFIED RECORD PLAYER CAPABLE OF AUTOMATICALLY HOUSING REPRODUCING STYLUS UPON REMOVAL OF RECORD DISC FROM THE RECORD PLAYER

[75] Inventor: Eishi Koiki, Sagamihara, Japan
[73] Assignee: Ozen Corporation, Japan
[21] Appl. No.: 422,687
[22] Filed: Sep. 24, 1982

[30] Foreign Application Priority Data

Jun. 14, 1982 [JP] Japan .................................. 57-101787

[51] Int. Cl.³ ............................ G11B 3/28; G11B 3/40
[52] U.S. Cl. ......................................... 369/63; 369/67; 369/177; 369/215; 369/258
[58] Field of Search .................. 369/63, 67, 177, 258, 369/215

[56] References Cited

U.S. PATENT DOCUMENTS

| | | | |
|---|---|---|---|
| 4,118,038 | 10/1978 | Watanabe | 369/63 |
| 4,123,065 | 10/1978 | Watanabe | 369/63 |
| 4,157,832 | 6/1979 | Watanabe | 369/63 |
| 4,402,071 | 8/1983 | Okamura et al. | 369/67 |

Primary Examiner—Steven L. Stephan
Attorney, Agent, or Firm—Basile, Weintraub & Hanlon

[57] ABSTRACT

A simplified record player having a fixed record member and a rotatable turn table carrying a sound reproducing stylus which rotates together with the turn table. Until the record is positioned on the record holding portion of the player, the reproducing stylus is disposed in a recessed portion or an opening so as to be shielded from the outside. When the record is positioned and fixed to the record holding portion, a projecting rod attached to the center of the record pushes a pusher placed about the center pin of the player such that the pusher advances along the center pin. By a wedge action given by an inclined face of the head of the pusher, a tone arm carrying the reproduction stylus is pushed outward so that the reproduction stylus can be positioned to confront the recorded face of the record. By virtue of this construction, the design defect of injuries to an operator's body by an exposed stylus can be entirely prevented.

4 Claims, 7 Drawing Figures

SIMPLIFIED RECORD PLAYER CAPABLE OF AUTOMATICALLY HOUSING REPRODUCING STYLUS UPON REMOVAL OF RECORD DISC FROM THE RECORD PLAYER

BACKGROUND OF THE INVENTION

1. Field of the Invention:

This invention relates to a simplified record player, and more particularly, to a record player in which placing of a record member in the casing causes a sound reproducing stylus to advance to the position ready for engagement with the recorded groove; while removal of the record disc from the record player is accompanied by a retraction of the reproducing stylus to its sheltered position.

2. Description of the Prior Art:

Heretofore, there have been proposed several simplified record players of a type in which a sound reproduction stylus rotates with a turn table relative to a fixed record disc confronting the stylus. For example, inventions disclosed by the specifications and drawing of the U.S. Pat. Nos. 4,118,038 and 4,123,065 can be called typical devices of this kind.

According to these prior art devices, since an upwardly directed reproducing stylus to be confronted with a downwardly facing recorded face of the record disc is covered by a record holder swingably attached to the upper face of a casing, there is no fear that the stylus may be exposed and injure the operator's hand or the like. However, since the devices are constructed such that the record disc or member is held on the record holder by being inserted through a slit opened in front of the record holder, it is troublesome for an operator, particularly for a child who operates this kind of device when it is used or incorporated in a toy, to conduct the insertion through such a slit. The inventor of this invention contemplated to develop a novel simplified record player which can be played by merely inserting or fixing a record member downward onto the casing. However, this type of device was still found to have such a kind of design defect that the reproducing stylus is left exposed at the record holding portion when the record disc is out of engagement with the holding portion and has been liable to injure the operator's hand in his handling of the device.

SUMMARY OF THE INVENTION

The present invention aims to obviate the aforementioned drawbacks.

Accordingly, an object of the present invention is to provide a simplified record player which can reproduce recorded items by a mere downward insertion of the record disc or member onto the holding portion. Another object of this invention is to provide a simplified record player which prevents the sound reproducing stylus from injuring an operator's hand by means of retracting the stylus when the record disc or record member is out of engagement with the holder but enabling the stylus to advance to the position confronting the recorded face only when the record member has been coupled to the holding portion. A further object of this invention is to provide a simplified record player capable of selectively playing any desired one of a plurality of recorded grooves in the record disc.

According to the present invention, a projecting rod provided at the center of a record member pushes a pusher slidably attached to a center pin and capable of being moved for advancing and retracting along the center pin so that the pusher can urge the sound reproducing stylus by means of a wedge plate to travel radially and outwardly to a position where it can confront the recorded face. Upon removal of the record member from the record holding portion or member after a playing of the record disc has been completed, stylus pressure exerted on the stylus is automatically released and the stylus on the tone arm will return and retract into an opening or a recessed portion by a return spring.

Any kind of driving means can be used for driving the turn table of this invention, for example, an electric motor or a spring motor can be used as a driving means. As will be mentioned later, a rim drive using an electric motor is preferred for this kind of record player. In this construction, an annular rim is attached on the reverse side of the turn table toward which an output shaft of the motor extends and frictionally engages. The electric motor is swingably supported by a pair of trunnions and the output shaft of the motor is urged by a spring to resiliently bias the turn table via the annular rim against the recorded face of the record member. Accordingly, this spring acts as a stylus force spring.

The above-mentioned pusher also pushes the turn table to make it advance against the spring along the center pin. Accordingly, once the record member has been coupled to the holding portion, the electric motor is tilted or swung and turns a start switch "ON" to rotate the turn table. When the tone arm reaches the end point of sound reproduction it pushes a lever disposed along the outer periphery of the turn table and turns the stop switch "OFF". Since the lever of the stop switch extends along the circumferential rim of the turn table, the stop switch can maintain the "OFF" position even if the turn table may overrun to some extent by inertia. As already mentioned, when the record member has been removed, stylus pressure is released allowing the stylus on the tone arm to return to the starting point of sound reproduction and turn the stop switch "ON", but the start switch is kept "OFF" unless the record member is fixed to the holding portion, so the record player will never start.

In the device embodying the present invention the reproduction stylus is completely retracted wherever the record member is out of engagement with the holding portion, so that there is no fear of injuring the operator. Also the reproduction stylus can be moved to a position confronting the recorded face by a mere action of fixing the record disc to the record holding portion.

When an electric motor is used as a driving means, it can be started by the mere fixing of the record member to the record holding portion. Also, the tone arm opens the stop switch as soon as the tone arm reaches the end point of sound reproduction. Moreover, as the stop switch is arranged to open via the lever extending along the circumferential rim of the record, starting and finishing of playing can be done in a very simple and exact manner.

DESCRIPTION OF THE PREFERRED EMBODIMENTS

Figure 1:
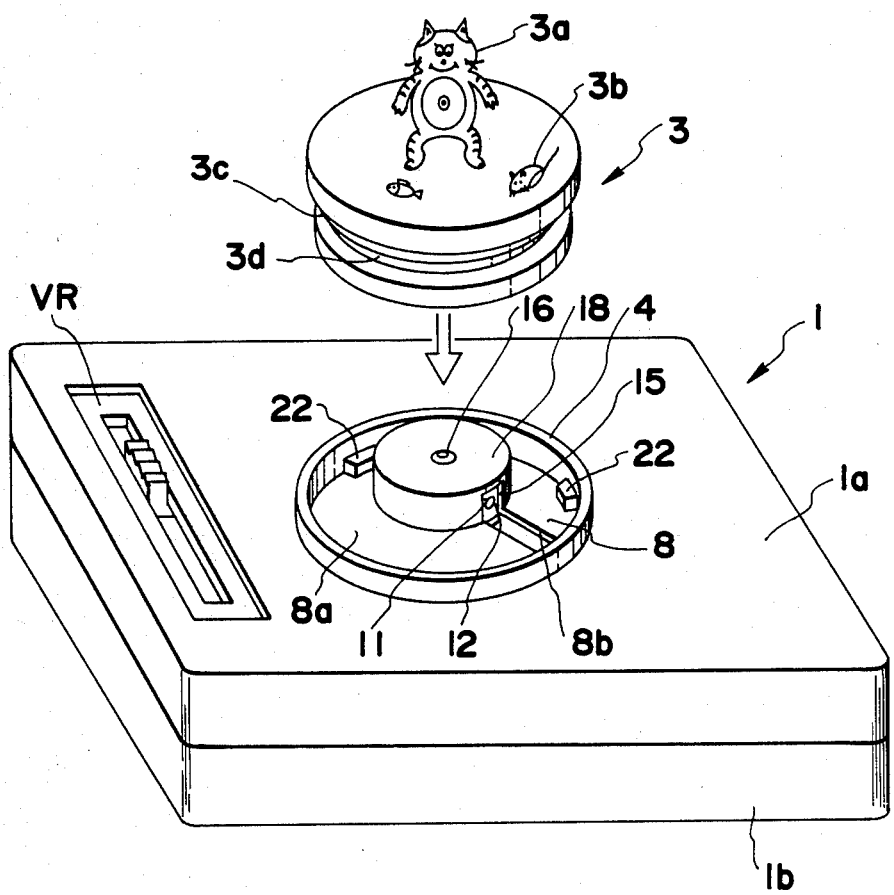
FIG. 1 is a perspective view of the simplified record player according to the present invention.

As show in FIG. 1, a casing 1 of this simplified record player is composed of two halves, namely, an upper half 1a and lower half 1b which together constitute a single housing.

The upper half 1a has on its upper face a record member holding portion 4, a peripheral portion of which extends a short height to form an annular guide rim. On the inner face and at the bottom of the holding portion, 4, a locking means 22 is disposed. The locking means 22 is composed of at least one and normally a plurality of pawls, each having tapered upper and lower faces to constitute a narrowed tip end which are urged by a spring means, not shown, toward the center of the holding portion 4 and are capable of being advanced or retracted.

In FIG. 1, numeral 3 denotes a record disc member 3 having, on its top face, a shaped knob 3a and a plurality of marks 3b each corresponding to the introductory part of the recorded grooves to be selected for playing. The side peripheral face of the record disc has a thickness larger than the height of the guide rim of the holding portion 4. Disposed on the side peripheral face of the record member 3 is a stepped portion 3c to be placed on the top end of the guide rim and a locking groove 3d to be engaged with the locking pawls 22.

In FIG. 1, numeral 8 is a turn table, the central part of which is formed to constitute an integral hollow boss 18. The turn table 8 has at its upper part a face plate 8a having an oblong aperture 8b opened starting from the root of the boss 18 to the portion slightly in front of the outer margin of the face plate 8a so as to define a path of travel for a sound reproducing stylus. A recessed portion in this embodiment formed as an opening 15 is defined at the side periphery of the boss 18. The recessed portion is contiguous to the radially inner end of said oblong aperture 8b and further communicates with the interior of the boss 18. The drawing shows the sound reproducing stylus 11 carried on a tone arm 12 as being received within the opening 15. The boss 18 has a guide hole 16.

Figure 3:
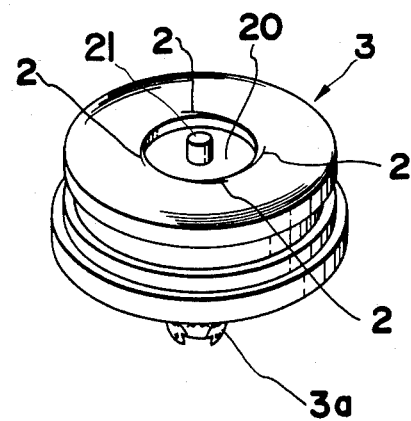
FIG. 3 is a perspective view showing a reverse or back side face of a record member.

Symbol VR in FIG. 1 denotes a rheostat, a knob of which can be slidably moved so as to change the electric resistance in a circuit leading to an electric motor to be described later so as to adjust the rotational speed of the turn table 8. The above-mentioned record member or record body 3 is inserted to the record holding portion 4 as shown by the arrow line in FIG. 1 and the recorded face, that is, the reverse side of the record member is constructed in a manner as shown in FIG. 3.

In this embodiment four recorded grooves 2 are formed on the recorded face, each having an introductory portion (the starting poing of sound reproduction) near the center, while the end point of sound reproduction is positioned at the outer marginal portion of the record 3.

The central part of the record 3 is formed to define a stepped concave portion 20, so as to receive the boss 18 of the turn table, at the center of which a projecting rod 21 having such an outside diameter that can be inserted into the guide hole 16 at the center of boss 18.

Figure 2:
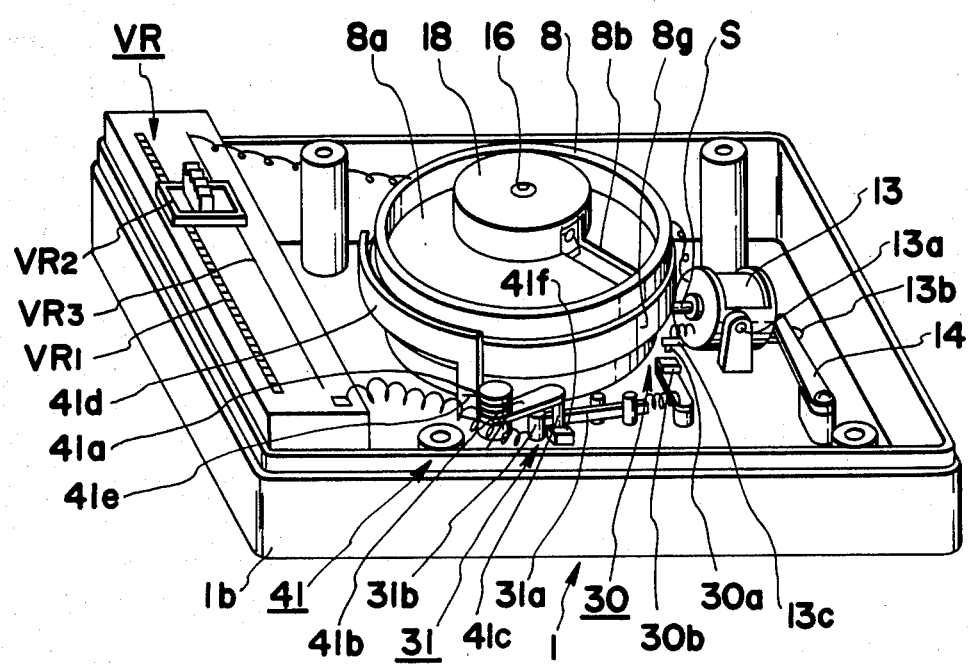
FIG. 2 is a perspective view of the record player with the upper half of its casing removed.
Figure 5:
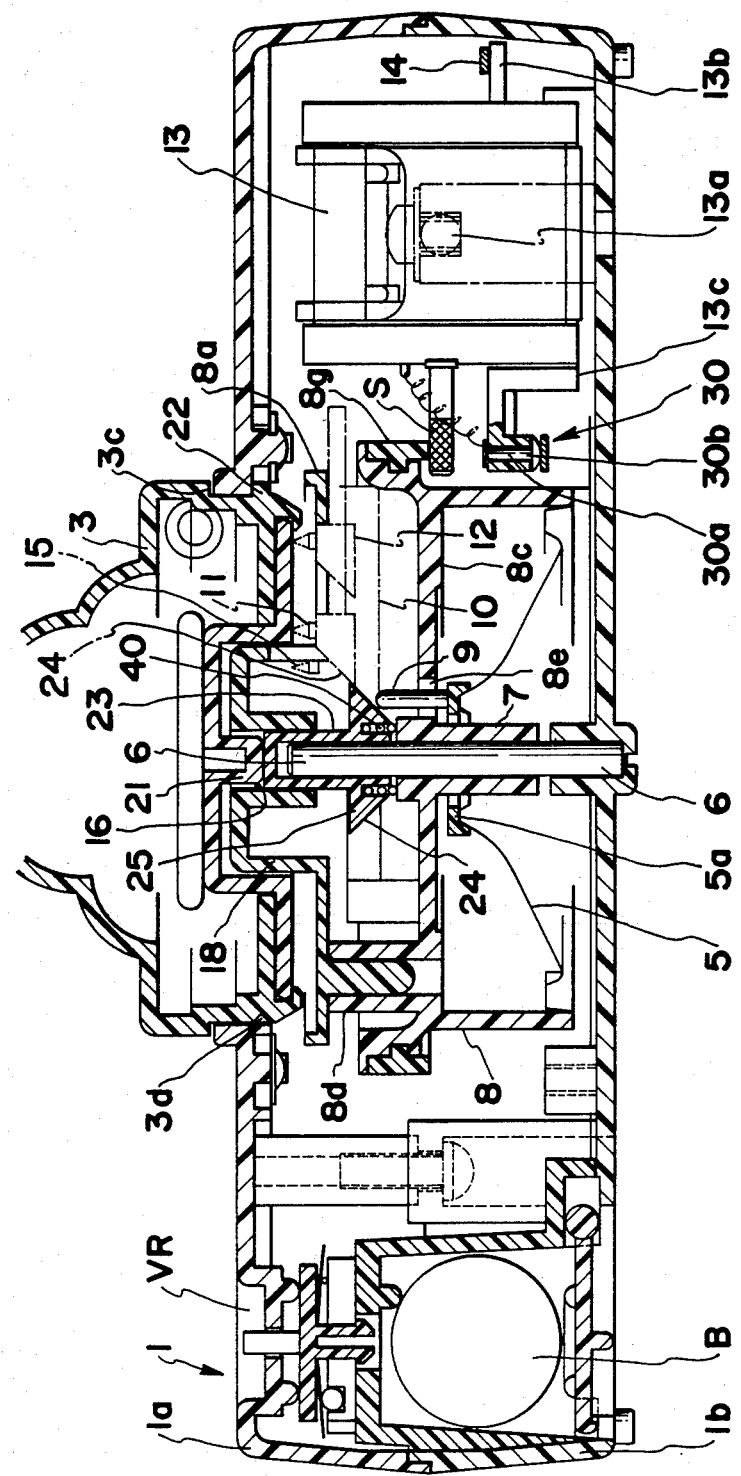
FIG. 5 is a sectional side view of the record player cut along a horizontal center line.

FIG. 2 shows the interior construction of the lower half of the casing 1b by removing the upper half of the casing. FIG. 5 is a sectional elevation view taken along a horizontal line passing through the center of the casing 1. The interior construction of the casing 1 will be explained by referring to FIGS. 1 and 5.

As shown in FIG. 5, a center pin 6 is disposed upright within the casing having a length sufficient to reach the upper part of the upper half 1a of the casing 1.

The center pin 6 carries around its outer surface the turn table 8, while being received by a sleeve 7 for receiving the center pin 6 so that the turn table 8 can freely rotatable and move axially.

The turn table 8 has a stacked construction consisting of an upper part and a lower part. The face plate 8a of the upper part is spaced apart from a base plate 8c at a predetermined distance by means of a plurality of upright posts 8d. From the reverse side of the base plate 8c, an annular side plate is dependantly formed to define a hollow space, within which a speaker unit 5 is received in a back-to-back relation with respect to the base plate 8c. A vibrating plate 5a is coaxially disposed on the narrowed top end of the speaker unit 5 in such a manner as not to touch the sleeve 7 for receiving and surrounding the center pin 6. Fixedly attached to the vibrating plate 5a is a vibrating pole 9 which extends upward through an aperture 8c until it abuts and supports a sound transmitting member 10 extending transverse about the base member 8c. However, the vibrating pole 9 is positioned so as not to contact the base plate 8c.

Figure 4:
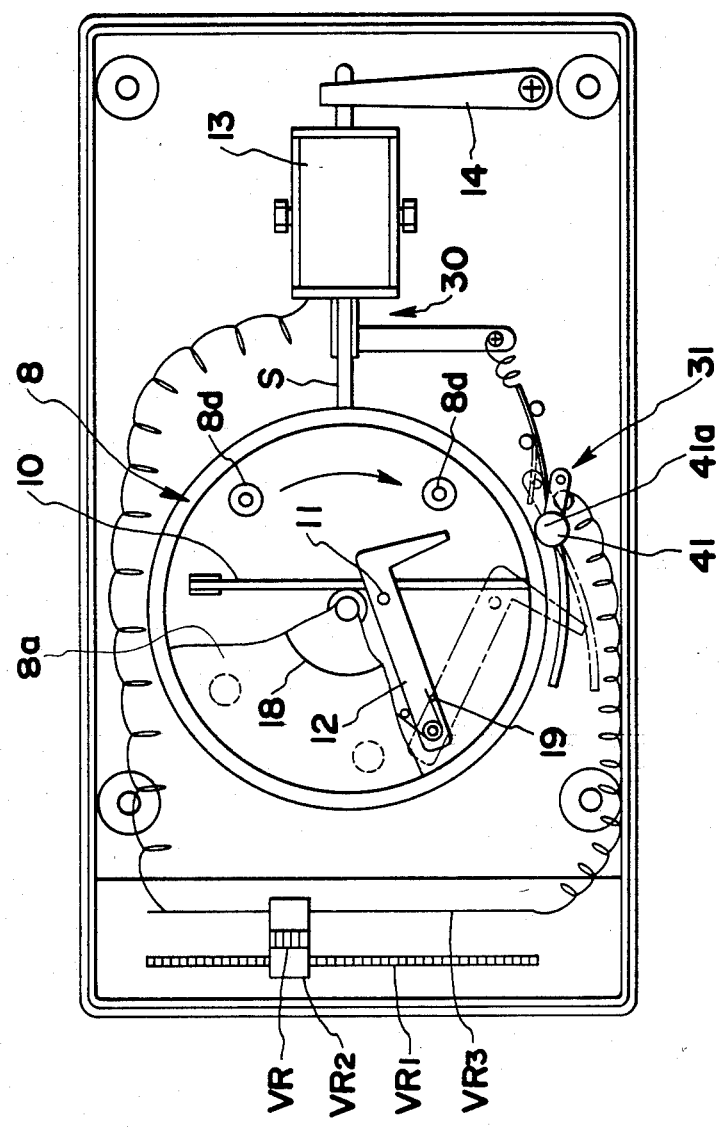
FIG. 4 is a plan view showing the interior of the record player by removing the upper half of the casing.

FIG. 4 clearly shows that the sound transmitting member 10 being transversely laid above the base member 8c of the turn table 8. As shown in FIG. 4, one end of a tone arm 12 is swingably supported on the surface of the base member 8c but below the back face of the face plate 8a; while the other end, namely, the free end of the tone arm carrying a sound reproducing stylus 11 is placed on the sound transmitting member 10. A biasing means such as a turn spring 19, acts on the tone arm 12 at the swingably supported end so as to urge the reproducing stylus 11 toward the center of the turn table 8. The tone arm 12 slidably travels on and along the sound transmitting member 10 and to the vibrating pole 9 and then amplified into audible sounds or voices.

As can be seen from FIGS. 4 and 5, the forward end of the swingable tone arm 12 is bent toward the periphery of the turn table 12 such that the tip end of the bent arm can project outwards through the gap defined between the face plate 8a and the base plate 8c (shown by the dot and dash line in FIG. 5) when the reproducing stylus 11 reaches the end point of sound reproduction.

As can be seen from FIG. 5, a pusher 23 having a head 25 of frustoconical shape having a bevelled face 24 inclining radially inward toward the base plate 8c is attached around the center pin 6 at a portion above the upper surface of the base 8c in such a manner that the pusher 23 abuts the upper end face of the sleeve 7 while being resiliently urged by a support spring 40 interposed between them so as to normally move in a direction away from the base plate 8c.

As shown in FIG. 5, a member having a tapered face 24 capable of closely mating with the tapered face 24 of the pusher 23 is provided on the tone arm 12 at a portion adjacent to the reproducing stylus 11 so that the above-mentioned two mating faces 24 and 24 can engage with each other when the reproducing stylus 11 is housed within the boss 18 through the opening 15.

In FIG. 5 the record member 3 is secured to the record holding portion 4 by the engagement of locking groove 3d with the locking means 22. In this position, projecting rod 21 is fully inserted into the guide hole 16 urging pusher 23 to advance against the resilient force imparted by the support spring 40.

The tone arm 12 carrying the reproducing stylus 11 is pushed outwards by the cooperative sliding action of the two mating tapered faces 24 from the position inside the opening 15 to the position capable of confronting the recorded face of the record member 3 so as to be ready for the next playing immediately before the record member has been locked tight. The turn table 8 has, as can be clearly seen from FIG. 5, an annular rim 8g of anti-wear elastomer material attached to the outer periphery of the base member 8 and which extends downward and spaced apart from the outer circumference of the base member 8c.

As can be seen from FIGS. 2, 4 and 5, an output shaft S of an electric motor 13 is journally received by a trunnion 13a and extends to engage the lowermost end of the annular rim 8g. The electric motor 13 has a tail rod 13b, on its rear end face opposite the front face where the output shaft S is disposed. The tail rod 13b is resiliently contacted by a leaf spring 14 which is supported to constitute a cantilever. The contact is such that resiliently urges the output shaft S toward the rim 8g thereby urging of the entire turn table body toward the recorded face of the record member 8. Since the reproducing stylus 11 has already been positioned confronting the recorded face of the record member 3 when the record member 3 is coupled to the record holding portion 4, further pushing of the record member 3 causes the turn table 8 to retract downward via the reproduction stylus 11 against the resilient force given by the leaf spring 14. This imparts necessary force to the stylus 11 output shaft S against the resilient force imparted by the leaf spring 14. A jaw 13c is attached to the motor at the same side of the output shaft of the motor 13. The free tip end of the jaw 13c carries a movable contact 30a. The other fixed contact 30b fabricated of a leaf spring is disposed to constitute a pair of contacts of the start switch 30 which becomes "OFF" before the record member 3 is fixed to the portion 4; while it turns "ON" when the record member 3 has been held fixedly at the record holding portion 4.

As shown in FIG. 2, the fixed contact 30b is connected to a movable contact 31a of a stop switch 31 disposed adjacent to the turn table 8. The fixed contact 31b of the stop switch 31 is connected to a battery B (shown in FIG. 5) placed beneath the rheostat VR, which is further connected to the electric motor 13 via a resistor element VR1 connected to the other pole of the battery B, a sliding connector VR2 and finally to a lead wire VR3 normally laid parallel to the resistor element VR1.

As shown in FIGS. 2 and 4, a lever means 41 is disposed adjacent to the stop switch 31. The lever means 41 comprises a vertical rod 41a, a swingable blade 41b pivotally supported on the vertical rod 41a, a pin 41c which acts on one end of the swingable blade 41b so as to move the movable contact 31a of the stop switch 31 away from contact with the fixed contact 31b, and a lever 41d extending along the outer periphery of the turn table 8 and almost at the same level as the gap defined between the face member 8a and the base member 8c. This lever means 41 is urged by a spring 41e such that the pin 41c acts to move away from the fixed contact 31b and the lever 41d is maintained at a predetermined distance from the outer periphery of the turn table 8 as is restrained by a stopper 41f.

Figure 6:
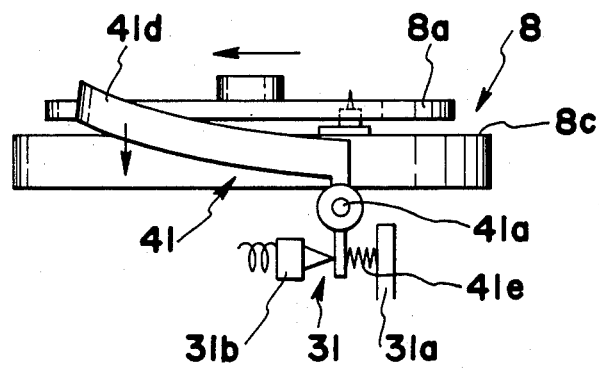
FIG. 6 is a front view showing another embodiment of the stop switch and lever means.
Figure 7:
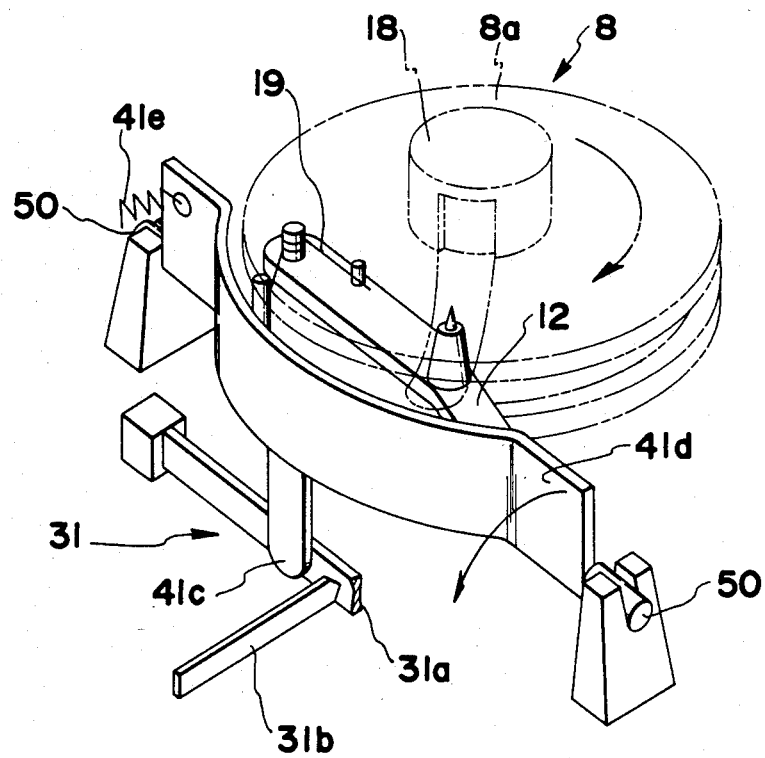
FIG. 7 is another embodiment of the stop switch and lever means.

The lever means 41 can be formed as such modified ones as shown in FIGS. 6 and 7. According to FIG. 6, swivel axis 41a is held horizontal, while the lever 41d extends along the outer periphery of the turn table 8 and slantedly across the outer side of the gap between the face member 8a. The base member 8c and the movable contact 31a of the stop switch 31 is attached to the opposite side of the lever 41d. Accordingly, when the tone arm 12 reaches the end point of sound reproduction with its tip end being projecting outside and passing through the gap formed between the face member 8a and the base member 8c, rotation of the turn table 8 in the direction shown by the arrow makes the tip end of the tone arm 12 urge the lever 41d in the downward direction as shown by another arrow, resulting in the movement of the movable contact 31a away from the fixed contact 31b. In the drawing, 41e is a spring for urging the lever 41d to a desired position.

In the modified embodiment shown by FIG. 7, the lever 41d of the lever means 41 extends along the outer periphery of the turn table 8 and at the height bridging the gap between the face member 8a and the base member 8c. The lever 41d is also supported by a pair of trunnions 50 disposed at the lower part of its two opposite ends and allows swivel motion as shown by an arrow. A pin 41c depends from the lower end of the lever 41d. Due to this construction, when the tone arm pushes the lever 41d, the lever 41d will swivel and makes the pin 41c swingably move and urges the movable contact 31a away from the contact with the fixed contact 31b. When the movable contact 31a is out of engagement with the pin 41, it engages the fixed contact 31b and turns the electric circuit "ON"; while, when the pin 41c rotates being urged by the depression of the tone arm 12, the movable contact 31a will move away from the fixed contact 31b and open the circuit. In the drawing, reference number 41e represents a spring which resiliently urges the lever 41d toward the predetermined position.

The simplified record player according to these embodiments can be operated in the following manner.

When an operator depresses and inserts the record member 3 in the record holding portion 4, the projecting rod 21 of the record member 3 will depress the pusher 23, the top end of which is disposed within the central guide hole 16 of the boss 18 of the turn table 8. The tapered face 24 formed on the head 25 of the pusher 23 slidably engages the mating tapered face 24 of the tone arm 12 and urges the tone arm 12 to move radially outward away from the position inside the opening 15 to the position where the sound reproducing stylus 1 can confront the recorded face of the record member 3. When the reproduction stylus 11 actually engages the recorded face of the record member 3, it urges the turn table 8 against the resilient force of the leaf spring 14. Concurrent with the exertion of the necessary stylus force to the reproducing stylus 11, the electric motor is tilted through the output shaft thus resulting in engagement of the movable contact 31a with the fixed contact 31b which turns the starting switch 30 "ON". The electric motor begins to rotate accompanied by rotation of the turn table 8. The reproducing stylus 11 travels, following the recorded groove which the stylus 11 initially engages, until it reaches the end point of sound reproduction. Accordingly, any desired recorded groove can be optionally selected by selecting specific phase angles of the record member 3 to be fixed to the record holding portion 4. When the reproducing stylus arrives at the end point of sound reproduction accompanying radially outward projection of the tip end of the tone arm 12 beyond the outer margin of the turn table 8, the tip end of the tone arm 12 abuts the lever 41d of the lever means 41 urged by the rotation of the turn table 8. This makes the movable contact 31a of the stop switch 31 move away from the fixed contact 31b and turns the stop switch "OFF", such that current to the electric motor 13 is cut off. Since the lever 41d is extending along the outer periphery of the turn table 8, the stop switch can be maintained "OFF" even if the turn table continues rotation by inertia past the end point of sound reproduction. Moreover, the turn table 8 is stopped quickly by the brake action due to the frictional engagement between the projected tone arm 12 and the lever 41d. Upon removal of the record member 3 from the record holding portion 4, stylus pressure exerted on the turn table 8 is released, allowing the turn table 8 to return to its original position along the center pin 6 and the tone arm 12 will return, by means of the turn spring, toward the starting point of sound reproduction and be received in the interior space of the boss 15 through the opening or into the recessed portion 15. At this moment, the stop switch 31 is "ON" but the start switch 30 has already been turned "OFF" due to the returning of the turn table 8 and the electric motor 13 to their original position, so that the electric motor 13 will not rotate further. Starting of the electric motor 13 for the next sound reproduction can be done by a mere locking of the record disc 3 to the record holding portion 4.

According to these embodiments of the present invention, when the record member is not placed on the casing, the sound reproducing stylus is always kept housed within a recessed portion or compartment substantially in a retracted state. On the other hand, when the record member is fixed to the casing, the sound reproducing stylus is automatically confronted with the recorded face and is ready for engagement therewith. Accordingly, the present invention enables ready manipulation and eliminates the fear of injuring an operator's hand.

What is claimed is:

1. In a simplified record player comprising a record holding portion for holding a record member without permitting its rotation, a turn table attached with an integrally formed speaker in coaxial and back-to-back relation thereto is received by a center pin disposed upright on the casing at an integrally formed sleeve capable of being axially moved along said center pin, a vibrating blade attached to said speaker in a manner surrounding but without contacting said sleeve of said turn table for receiving the center pin, a sound transmitting bar extending above and along said turn table substantially connected to said speaker by being attached at its middle part to said vibrating blade, a tone arm swingably disposed on said turn table and being slidably supported by said sound transmitting bar capable of begin swung while sliding on said sound transmitting bar capable of being swung while sliding on said sound transmitting bar and with its sound reproducing stylus directed to said record member, said turn table being connected to a drive means and normally urged by spring means toward the recorded face of said record member, the improvement comprising:

a. said turn table including on its central portion a boss having a height higher than the tip end of said reproduction stylus, a guide hole on the upper central portion and a recessed portion formed in the side wall of said boss;
b. means for biasing said tone arm toward said boss such that said sound reproduction stylus can be received in said recessed portion of said boss;
c. said record member including at its central bottom portion an annular concave portion adapted to receive at least the upper portion of said boss of the turn table, and a projecting rod formed on the center portion of said concave portion of said record member and adapted to be inserted into said guide hole of said boss;
d. said record holding portion comprises means for locking said record member in an axial direction;
e. a pusher slidably attached around said center pin which is advanced by being pushed by said projecting rod;
f. a head disposed at the lower end of said pusher for urging said tone arm outward from said recessed portion of said boss by a wedge action given by an inclined surface against said biasing means after said record member has been placed on said record holding portion but immediately before said record member is fixed by said locking means; and whereby a necessary stylus force to be imparted to said sound reproducing stylus being engaged with the recorded groove of said record member after having been pushed out from said recessed portion of said boss is assured by a cooperative action of said biasing means urging said turn table toward said recorded face and said member having been fixed to said record holding portion.

2. The improvement as claimed in claim 1 wherein said record member has such a thickness that it can project upward when said record member has been fixed to said record holding portion.

3. The improvement as claimed in claim 1 wherein any desired one of a plurality of recorded grooves can be selected by selectively positioning the sound reproducing stylus to the introductory part of said desired groove.

4. The improvement as claimed in claim 1 wherein said drive means is an electric motor swingably supported by trunnions for tilting, said electric motor having an output shaft being connected to said turn table by a rim drive means and said tilting of said motor can be effected by spring means and said output shaft urges said turn table toward said recorded face; the improvement further comprising:

an electric circuit including a start switch which is "ON" when said electric motor is tilted when pushed by said turn table and "OFF" when said turn table has been released from urging by removal of said record member from engagement with said record holding portion; and a stop switch which is "OFF" by being depressed by said tone arm upon its arrival at the end point of sound reproduction and is "ON" by retraction of said tone arm into said recessed portion of said boss due to releasing of applied stylus pressure when said record member has been removed from engagement with said record holding portion;

said stop switch comprising a lever extended along the outer periphery of said turn table so as to be depressed by said tone arm upon its arrival at the end point of playing.

* * * * *